3,056,799
PROCESSES AND INTERMEDIATE PRODUCTS
Benjamin F. Tullar, East Greenbush, N.Y., assignor to Sterling Drug Inc., New York, N.Y., a corporation of Delaware
No Drawing. Filed July 20, 1959, Ser. No. 828,003
36 Claims. (Cl. 260—319)

This invention relates to the resolution of certain racemic organic compounds.

More particularly, this invention relates to: (I) novel processes for resolving racemic N-acyl-alpha-amino-monocarboxylic acids and to novel salts useful in said resolution process; (II) to novel monobasic salts of optically active threo-2-amino-1-(p-methylmercaptophenyl)-1,3-propanediols and of optically active threo-2-amino-1-(p-methylsulfonylphenyl)-1,3-propanediols, respectively, with optically active alpha-amino-lower aliphatic dicarboxylic acids and to processes of resolution using said salts.

It is an object of my invention to provide methods, and intermediates useful in said methods, for obtaining the optically active forms of certain amino acids and of threo-2-amino-1-(p-methylmercaptophenyl)-1,3-propanediol from their respective optically inactive racemic forms. Further objects of my invention will be apparent in the description which follows.

PART I.—RESOLUTION OF N-ACYL-ALPHA-AMINO-MONOCARBOXYLIC ACIDS

It is an object of Part I of this invention to provide convenient and economical means whereby the D- and L-forms of certain N-acyl-alpha-amino-monocarboxylic acids can be obtained from the corresponding optically inactive racemic forms of these compounds. This part of my invention is particularly adapted to the resolution of the N-acyl derivatives of the racemic forms, e.g., produced by synthetic methods, corresponding to many of the optically active alpha-amino-monocarboxylic acids produced by the hydrolysis of proteins. It is known that these N-acyl-alpha-amino-monocarboxylic acids are easily deacylated by hydrolysis to yield the corresponding alpha-amino-monocarboxylic acids; and when the natural optically active form of the amino acid is desired as the product of this hydrolysis, the appropriate optically active N-acyl-alpha-aminomonocarboxylic acid is of course employed as the starting material. It will be appreciated that this resolution process of my invention affords a convenient route to the required optically active N-acyl-alpha-amino-monocarboxylic acids.

I have discovered that the diastereomeric salts formed by interaction of an optically active threo-2-amino-1-(p-methylsulfonylphenyl)-1,3-propanediol and an optically active threo-2-amino-1-(p-methylmercaptophenyl)-1,3-propanediol, respectively, with a racemic N-acyl-alpha-amino-monocarboxylic acid have widely differing solubilities which make these salts valuable compounds for use in the reslution of the racemic acid into the D- and L-forms thereof.

In accordance with Part I of my invention, a racemic N-acyl-alpha-amino-monocarboxylic acid of the class consisting of N-acyl-alpha-amino-lower alkanoic acids, N-acyl-alpha-amino-beta-hydroxy-lower alkanoic acids, N-acylphenylalanines, N-acyl methionines, and N-acyltryptophans, where acyl represents a radical of the class consisting of benzoyl and lower alkanoyl, are resolved by the process which comprises: dissolving the racemic N-acyl-alpha-amino-monocarboxylic acid with an equimolecular quantity of an optically active threo-2-amino-1-(p-methylsulfonylphenyl)-1,3-propanediol or of an optically active threo-2-amino-1-(p-methylmercaptophenyl)-1,3-propanediol in a solvent of the class consisting of water-soluble lower alkanols, water, and mixtures thereof; separating the diastereomeric salts thus formed by fractional crystallization; and regenerating at least one, and both if desired, of the N-acyl-D-alpha-amino-monocarboxylic acid and N-acyl-L-alpha-amino-monocarboxylic acid from the respective separated diastereomeric salts.

A particular advantage of this process of resolution is the unexpectedly sharp and clean separation of the diastereomeric salts in the fractional crystallization step resulting from the widely differing solubilities of these novel salts in the specified solvents. A further advantage is the ease of separation and recovery of the amine resolving agent.

The N-acyl-alpha-amino-lower alkanoic acids which are employed in my process include for example racemic forms of N-acyl-alpha-aminopropionic acids, or N-acyl-alanines; N-acyl alpha-aminobutyric acids; N-acyl-alpha-aminovaleric acids, such as N-acylvaline; and N-acyl-alpha-aminocaproic acids, such as N-acylleucines, N-acyl-norleucines, and N-acylisoleucines. The N-acyl-alpha-amino-beta-hydroxy-lower alkanoic acids are illustrated by N-acyl-alpha-amino-beta-hydroxypropionic acids, or N-acyl-serines; N-acyl-alpha-amino-beta-hydroxybutyric acids, such as N-acylthreonines and N-acyl-alpha-methyl-serines; and N-acyl-alpha-amino-beta-hydroxyvaleric acids.

The above described N-acyl-alpha-amino-lower alkanoic acids as well as the N-acylphenylalanines, N-acyl-methionines, and N-acyltryptophans which are employed in my process are of course old compounds as a class and can be obtained by the known methods described in the prior art. As indicated hereinabove, the term acyl is employed in the description of my invention to include benzoyl and lower alkanoyl. The latter radicals are the lower, saturated fatty carboxylic acyl radicals, as for example formyl, acetyl, propionyl, and butyryl radicals. In general, I prefer to employ racemic N-acetyl- or N-benzoyl-alpha-amino-monocarboylic acids in my process.

The optically active amines employed in my above-described novel processes, namely the D- and L-forms of threo-2-amino-1-(p-methylsulfonylphenyl)-1,3-propanediol and of threo-2-amino-1-(p-methylmercaptophenyl)-1,3-propanediol are readily obtained by deacylation of the corresponding N-acyl derivatives by treatment with hot mineral acid as described in Cutler and Suter U.S. Patent 2,759,971 and Suter U.S. Patent 2,759,972, both issued August 21, 1956, and by Cutler, Stenger, and Suter, J. Am. Chem. Soc. 74, 5475–5481 (1952); or, the D- and L-threo-sulfonyl-amines can be prepared by oxidizing the corresponding D- and L-threo-mercapto-amines with peracetic acid containing one equivalent of acetic acid. The D-threo-2-amino-1-(p-methylsulfonylphenyl) - 1,3 - propanediol melts at 141.4–142.6° C. (recrystallized from n-butanol) and has $[\alpha]_D^{25}$ —19.8° (c. 1% in 95% ethanol); and the enantiomeric L-threo-amine melts at 141–142.5° C. and has $[\alpha]_D^{25}$ +19.7° (c. 1% in 95% ethanol). In some cases there may be little or no basis for a choice between the two forms of the amine to be used. However, from an economic standpoint, I prefer to employ the L-threo form of each. Thus I prefer to use L-threo-2-amino - 1 - (p - methylsulfonylphenyl)-1,3-propanediol, since the N-acyl derivatives of an enantiomeric D-form, from which the D-threo-amine is prepared, are antibacterially active whereas the N-acyl derivatives of the L-threo-amine have no practical utility as antibacterial agents. And I prefer to employ the L-threo-2-amino - 1 - (p - methylmercaptophenyl)-1,3-propanediol (which is dextrorotary), since the enantiomeric D-form (which is levorotary) is directly useful for the preparation of antibacterially active N-acyl derivatives whereas the N-acyl derivatives of the L-form have no practical utility as antibacterial agents. Moreover, the diastereomeric L-threo-2-amino - 1 - (p - methylmercaptophenyl)-1,3-propanediol salt of the optically active form corresponding to that of the natural amino acid is less soluble in the solvents employed in the process of my invention in each instance than is the diastereomeric D-threo-amine salt; thus, when the natural form of the amino acid is the desired form, as will usually be the case, there is a definite advantage in having the salt of the preferred optical form separate as the initial crop in the fractional crystallization step.

The water-soluble lower alkanols which can be employed as a solvent medium in my process include methanol, ethanol, the propanols, and the butanols. I generally prefer methanol or ethanol when an alkanol is used.

My novel process for resolving N-acyl-alpha-amino lower aliphatic monocarboxylic acids can be carried out in several different ways, the particular mode of operation being a matter of convenience, which may depend on the choice of the racemic acid to be resolved. Thus, for example, the optically active threo-2-amino-1-(p-methylsulfonylphenyl)-1,3-propanediol or optically active threo-2-amino - 1 - (p - methylmercaptophenyl)-1,3-propanediol and the N-acyl-alpha-amino-monocarboxylic acid are dissolved together in hot lower alkanol, such as methanol or ethanol, or water or a mixture thereof and the solution thus obtained is cooled and if necessary concentrated by evaporation until the solution is supersaturated with respect to the less soluble of the two diastereomeric salts, and it preferentially crystallizes from solution. In some instances, when water or an alkanol-water mixture is used as the solvent, the initiation of crystallization can be brought about by addition of alkanol to the solution rather than, or in addition to, cooling the solution. Optionally, but advantageously, the crystallization processes are aided by the conventional expedient of seeding the solution with a few crystals of the compound which is expected to separate from solution.

The first crop of the less soluble diastereomeric salt which crystallizes from solution is generally of high quality and in good yield. The recovery of the more soluble diastereomeric salt from the mother liquor is carried out by evaporating the solution to dryness, thus producing a residue of the desired salt in crude form which can then be purified or, alternatively, the mother liquor is concentrated by evaporation, thereby causing the separation of a crop of the desired salt. When desired, additional crops of the two diastereomeric salts can be obtained in simple fashion from the mother liquors, as illustrated fully hereinafter in the detailed examples.

The regeneration or release of the D- and L-forms of the N-acyl-alpha-amino-monocarboxylic acids from the respective separated diastereomeric salts is readily effected by mixing with a slight excess of an acid or base in the conventional manner for regeneration of organic amines and weak acids from their salts with each other. The recovery of the N-acyl-alpha-amino-monocarboxylic acids as well as the D- or L-forms, as the case may be, of the amine is generally in good yield and quality.

The novel salts of the N-acyl-D- and L-alpha-amino-monocarboxylic acids with the optically active threo-2-amino-1-(p-methylsulfonylphenyl) - 1,3 - propanediol and with the optically active threo-2-amino-1-(p-methylmercaptophenyl)-1,3-propanediol which are obtained as intermediates in my new processes are generally stable, nonhygroscopic, white crystalline solids which are easily isolated in pure form and which have sharp melting points.

Part I of my invention is illustrated by the following examples without, however, being limited thereto.

EXAMPLE 1

*Resolution of Racemic N-Acetylvaline*

To a solution of 15.9 g. of N-acetyl-DL-valine in 100 ml. of methanol there was added a solution of 24.5 g. of L-threo-2-amino - 1 - (p - methylsulfonylphenyl)-1,3-propanediol in 200 ml. of methanol. The resulting mixture was allowed to stand at 25° C. for four hours, and then the heavy crystalline precipitate which had separated from solution was collected on a filter and washed with a few ml. of methanol and dried. There was thus obtained 17.6 g. of the L-threo-2-amino-1-(p-methylsulfonylphenyl)-1,3-propanediol salt of N-acetyl-D-valine which melted at 218–220° C. Mixing an aqueous solution of this salt with an excess of hydrochloric acid yielded a precipitate of 4.5 g. of N-acetyl-D-valine which after collection and drying melted at 167–169° C. The methanolic resolution liquor after collection of the L-threo-amine-D-acid salt was evaporated to dryness, and the residue was dissolved in water and treated with a slight excess of hydrochloric acid to yield a precipitate of N-acetyl-L-valine.

EXAMPLE 2

*Resolution of Racemic N-Acetylmethionine*

19.1 g. of N-acetyl-DL-methionine and 24.5 g. of L-threo-2-amino - 1 - (p - methylsulfonylphenyl)-1,3-propanediol were dissolved together in 400 ml. of methanol and the solution was allowed to stand for twelve hours at 0–5° C. The crystalline needles which had separated from solution were then collected on a filter, washed with a few ml. of methanol and ether and dried at 70° C. There was thus obtained 19.8 g. of the L-threo-2-amino-1-(p-methylsulfonylphenyl)-1,3-propanediol salt of N-acetyl-D-methionine which melted at 182–184° C. The melting point of this product remained unchanged after it had been recrystallized from methanol. 15.4 g. of this salt was mixed with 4 ml. of concentrated hydrochloric acid and 10 ml. of water. When the solution thus obtained was saturated with sodium chloride and allowed to stand at 5° C., there separated from solution almost the theoretical quantity of L-threo-2-amino-1-(p-methylsulfonylphenyl) - 1,3 - propanediol hydrochloride. This product was collected on a filter, and the filtrate was extracted with ethyl acetate. The ethyl acetate solution was evaporated and the residue thus obtained was recrystallized from 20 ml. of ethyl acetate, thus yielding 5.0 g. of N-acetyl-D-methionine which melted at 102–104° C. and had $[\alpha]_D^{25}$ +20.5° (c. 4% in water). By evaporating the methanolic resolution liquors to dryness, dissolving the residue in water and mixing with a slight excess of hydrochloric acid, there was obtained N-acetyl-L-methionine, M.P. 104° C., $[\alpha]_D^{25}$ −20.3° (c. 4% in water).

EXAMPLE 3

*Resolution of Racemic N-Benzoylthreonine*

2.23 g. of N-benzoyl-DL-threonine and 2.46 g. of L-threo-2-amino-1-(p - methylsulfonylphenyl)-1,3-propanediol were dissolved together in 35 ml. of methanol. The solution was seeded with a few crystals of the L-threo-2-amino-1-(p-methylsulfonylphenyl)-1,3-propanediol salt of N-benzoyl-L-threonine and allowed to stand for one hour at 25° C. The crystalline solid which had separated from solution was then collected on a filter, washed with a few ml. of methanol, and dried at 70° C. There was thus obtained 2.2 g. of the L-threo-2-amino-1-(p-methylsulfonylphenyl)-1,3-propanediol salt of N-benzoyl-L-threonine which melted at 187–189° C. The melting point of this product remained unchanged after it had been recrystallized from 95% ethanol. This salt was mixed in aqueous solution with hydrochloric acid to yield a precipitate of N-benzoyl-L-threonine which after collection on a filter and drying melted at 150–151° C. and had $[\alpha]_D^{25}$ +26.15° (c. 2% in water).

By evaporating the filtrate from the L-threo-amine-L-acylamino acid salt, there is obtained the L-threo-2-amino-1-(p-methylsulfonylphenyl)-1,3-propanediol salt of N-benzoyl-D-threonine. By mixing an aqueous solution of this salt with hydrochloric acid, there is obtained a precipitate of N-benzoyl-D-threonine.

The racemic forms of N-formylthreonine, N-acetylthreonine, N-propionylthreonine, and N-butyrylthreonine can be resolved in a manner similar to that described above for racemic N-benzoylthreonine.

EXAMPLE 4

*Resolution of Racemic N-Benzoyl-Alpha-Methylserine*

A 10% solution of the L-threo-2-amino-1-(p-methylsulfonylphenyl)-1,3-propanediol salt of N-benzoyl-DL-alpha-methylserine in 95% ethanol was seeded with a few crystals of the L-threo-2-amino-1-(p-methylsulfonylphenyl) - 1,3 - propanediol salt of N-benzoyl - L - alpha-methylserine and the solution was allowed to stand for one hour at 25° C. The crop of L-threo-2-amino-1-(p-methylsulfonylphenyl)-1,3-propanediol salt of L-alpha-methylserine, M.P. 168–170° C., which crystallized from solution was collected on a filter. An aqueous solution of this salt was mixed with a slight excess of hydrochloric acid to yield a precipitate of N-benzoyl-L-alpha-methylserine, M.P. 128–130° C. By heating the N-benzoyl-L-alpha-methylserine with hydrobromic acid, there is obtained L-alpha-methylserine, M.P. 284–285° C. (dec.), $[\alpha]_D^{25}$ —5.4° (c. 1% in water).

The L-threo-2-amino-1-(p - methylsulfonylphenyl)-1,3-propanediol salt of N-benzoyl - D - alpha-methylserine, which is recovered by evaporating the ethanolic mother liquor to dryness, is converted by mixing with an excess of hydrochloric acid to N-benzoyl-D-alpha-methylserine, M.P. 127–129° C.

EXAMPLE 5

*Resolution of Racemic N-Benzoylserine*

A 5% solution of the L-threo-2-amino-1-(p-methylsulfonylphenyl)-1,3-propanediol salt of N-benzoyl-DL-serine in 95% ethanol was seeded with a few crystals of the L-threo-2-amino-1-(p-methylsulfonylphenyl)-1,3-propanediol salt of N-benzoyl-L-serine and allowed to stand for one hour at 25° C. The crop of L-threo-2-amino-1-(p-methylsulfonylphenyl)-1,3-propanediol salt of N-benzoyl-L-serine, M.P. 184–186° C., which crystallized from solution was collected on a filter and then converted to N-benzoyl-L-serine, M.P. 148–149° C.

The L-threo-2-amino-1-(p - methylsulfonylphenyl)-1,3-propanediol salt of N-benzoyl-D-serine is recovered from the filtrate obtained above, and mixing an aqueous solution of this salt with a slight excess of hydrochloric acid produces a precipitate of N-benzoyl-D-serine, M.P. 148–150° C.

The N-benzoyl-L-serine and N-benzoyl-D-serine are readily converted to L-serine and D-serine, respectively, by hydrolysis by heating with hydrobromic acid.

EXAMPLE 6

*Resolution of Racemic N-Acetylisoleucine*

A 5% solution of the L-threo-2-amino-1-(p-methylsulfonylphenyl)-1,3-propanediol salt of N-acetyl-DL-isoleucine in 95% ethanol was seeded with a few crystals of the L-threo-2-amino-1-(p - methylsulfonylphenyl)-1,3-propanediol salt of N-acetyl-L-isoleucine and the solution was allowed to stand overnight (about sixteen hours) at 5° C. The crop of L-threo-2-amino-1-(p-methylsulfonylphenyl)-1,3-propanediol salt of N-acetyl-L-isoleucine, M.P. 192–193° C., which crystallized from solution was collected on a filter and then converted, by mixing with a slight excess of hydrochloric acid, to N-acetyl-L-isoleucine, M.P. 148–150° C., $[\alpha]_D^{25}$ —8.0° (c. 2% in water).

By evaporating the filtrate obtained above, dissolving the residue in water and seeding, there is obtained the L-threo-2-amino - 1 - (p - methylsulfonylphenyl)-1,3-propanediol salt of N-acetyl-D-isoleucine; from the salt, N-acetyl-D-isoleucine, M.P. 148–150° C., was readily obtained by mixing with a slight excess of hydrochloric acid.

The racemic forms of N-formylisoleucine, N-propionylisoleucine, and N-butyrylisoleucine can be resolved in a manner similar to that described above for racemic N-acetylisoleucine.

EXAMPLE 7

*Resolution of Racemic N-Acetyltrytophan*

A 5% solution of the L-threo-2-amino-1-(p-methylsulfonylphenyl)-1,3-propanediol salt of N-acetyl-DL-tryptophan in water was seeded with a few crystals of the L-threo-2-amino - 1 - ( p- methylsulfonylphenyl)-1,3-propanediol salt of N-acetyl-L-tryptophan and the solution was allowed to stand for one hour at 25° C. The crop of L-threo-2-amino-1-(p - methylsulfonylphenyl)-1,3-propanediol salt of N-acetyl-L-tryptophan, M.P. 210–212° C., which crystallized from solution was collected on a filter and then converted, by mixing with a slight excess of hydrochloric acid, to N-acetyl-L-tryptophan, M.P. 187–189° C., $[\alpha]_D^{25}$ +29° (c. 1% in water containing an amount of sodium hydroxide stoichiometrically equivalent to the amount of N-acylamino acid).

The L-threo-2-amino-1-(p - methylsulfonylphenyl)-1,3-propanediol salt of N-acetyl-D-tryptophan is recovered from the filtrate obtained above and is converted to N-acetyl-D-tryptophan by mixing with a slight excess of hydrochloric acid, M.P. 184–187° C., $[\alpha]_D^{25}$ —29.8° (c. 1% in water containing an amount of sodium hydroxide stoichiometrically equivalent to the amount of N-acylamino acid). From the acidic mother liquor, by concentration and making alkaline by treatment with aqueous sodium hydroxide solution, there was recovered substantially the theoretically expected quantity of L-threo-2-amino-1-(p - methylsulfonylphenyl)-1,3-propanediol.

The N-acetyl-L-tryptophan and N-acetyl-D-tryptophan can be converted to L-tryptophan and D-tryptophan, respectively, by hydrolysis by heating with hydrochloric acid.

EXAMPLE 8

*Resolution of Racemic N-Acetylphenylalanine*

A 5% solution of the L-threo-2-amino-1-(p-methylsulfonylphenyl)-1,3-propanediol salt of N-acetyl-DL-phenylalanine in 95% ethanol was seeded with a few crystals of the L-threo-2-amino-1-(p-methylsulfonylphenyl)-1,3-propanediol salt of N-acetyl-L-phenylalanine and the solution was allowed to stand for one hour at 25° C. The crop of L-threo-2-amino-1-(p-methylsufonylphenyl)-1,3-propanediol salt of N-acetyl-L-phenylalanine which crystallized from solution was collected on a filter. This salt, which melted at 197–99° C., is converted to N-acetyl-L-phenylalanine, M.P. 170–172° C., by mixing with a slight excess of hydrochloric acid.

By concentrating the filtrate obtained above and seeding with a few crystals of the L-threo-amine-D-acylamino acid salt and allowing the solution to stand for a few hours at 25° C., there was obtained the L-threo-2-amino-1-(p-methylsulfonylphenyl)-1,3-propanediol salt of N-acetyl-D-phenylalanine, which melted at 190–192° C. This salt is converted to N-acetyl-D-phenylalanine, M.P. 168–170° C.

EXAMPLE 9

*Resolution of Racemic N-Acetyltryptophan*

430 g. of L-threo-2-amino-1-(p-methylmercaptophenyl)-1,3-propanediol was dissolved in six liters of methanol by warming the solution to 50–60° C. This solution was cooled to 25–30° C. and then added rapidly to a slowly stirring solution of 500 g. of N-acetyl-DL-tryptophan in ten liters of methanol. The resulting solution was seeded with a few small crystals of the L-threo-2-amino-1-(p-methylmercaptophenyl)-1,3-propanediol salt of N-acetyl-L-tryptophan and stirred gently for 3–4 hours at 25–30° C. The crystalline salt which separated from the solution was collected on a filter, washed well with methanol, and dried at 40–50° C. There was thus obtained 475 g. of the L-threo-2-amino-1-(p-methylmercaptophenyl)-1,3-propanediol salt of N-acetyl-L-tryptophan which melted, when heated rapidly, at 228–231° C. (dec.). This salt was purified by one recrystallization from 50% alcohol to yield a product melting at 228–230° C. (dec.) and having $[\alpha]_D^{25}$ +30.8° (c. 0.5% in 50% ethanol).

The filtrate was concentrated to a volume of four liters by distilling off methanol at atmospheric pressure. After this solution had stood overnight (about sixteen hours), at 25° C., the solid which had separated from solution was collected on a filter and dried. This product, which was the L-threo-2-amino-1-(p-methylmercaptophenyl)-1,3-propanediol salt of N-acetyl-D-tryptophan, weighed 336 g. and melted at 193–195° C.; $[\alpha]_D^{25}$ −8° (c. 1% in 50% ethanol).

Additional quantities of the L-threo-amine-L-acid and L-threo-amine-D-acid salts were obtained as follows. The filtrate from the crop of L-threo-amine-D-acid salt was concentrated to a volume of two liters by evaporation, seeded with a few crystals of the L-threo-amine-L-acid salt, and allowed to stand overnight at 25° C. The solution was then filtered to recover a second crop of 30 g. of crude L-threo-2-amino-1-(p-methylmercaptophenyl)-1,3-propanediol salt of N-acetyl-L-tryptophan which had separated from solution. The filtrate was concentrated by evaporation to a volume of one liter and cooled overnight at 5° C. and there was then collected a second crop of the L-threo-2-amino-1-(p-methylmercaptophenyl)-1,3-propanediol salt of N-acetyl-D-tryptophan which weighed 112 g. and melted at 187–193° C. After the filtrate had stood for several hours at 25° C., a third crop of 10 g. of crude L-threo-amine-L-acid salt separated from solution and was collected. The mother liquor was evaporated to dryness, the residue thus obtained was dissolved in water, decolorizing charcoal was added, and the solution was made alkaline by addition of sodium hydroxide solution, thereby precipitating 15 g. of L-threo-2-amino-1-(p-methylmercaptophenyl)-1,3-propanediol.

N-Acetyl-L-Tryptophan 436 g. of the L-threo-2-amino-1-(p-methylmercaptophenyl)-1,3-propanediol salt of N-acetyl-L-tryptophan was suspended in three liters of water at 70° C. There was rapidly added 83 ml. of concentrated hydrochloric acid to the strongly stirred solution. The salt dissolved completely and rapidly and then gradual crystallization of N-acetyl-L-tryptophan began. After separation of solid at room temperature had substantially ceased, the solution was cooled to 5° C. The crystalline solid which had separated from solution was then collected, washed with three 200 ml. portions of cold water, and dried at 40–50° C. There was thus obtained 223 g. of N-acetyl-L-tryptophan which melted at 187–190° C. and had $[\alpha]_D^{25}$ +29° (c. 1% in water containing an amount of sodium hydroxide stoichiometrically equivalent to the amount of N-acylamino acid). The filtrate was retained for recovery of L-threo-2-amino-1-(p-methylmercaptophenyl)-1,3-propanediol.

N-Acetyl-D-Tryptophan

The 336 g. and 112 g. crops of the L-threo-2-amino-1-(p-methylmercaptophenyl)-1,3-propanediol salt of N-acetyl-D-tryptophan were combined and mixed with concentrated hydrochloric acid in a manner similar to that described above in the preparation of N-acetyl-L-tryptophan. There was thus obtained 236 g. of N-acetyl-D-tryptophan which melted at 185–187° C. and had $[\alpha]_D^{25}$ −29.8° (c. 1% in water containing an amount of sodium hydroxide stoichiometrically equivalent to the amount of N-acylamino acid). The filtrate was combined with the filtrate from the preparation of N-acetyl-L-tryptophan, the solution was made alkaline by treatment with sodium hydroxide solution, was half-saturated with sodium chloride, and then was cooled to 5° C. There separated from the solution 410 g. of L-threo-2-amino-1-(p-methylmercaptophenyl)-1,3-propanediol which melted at 151–153° C.

The N-acetyl-L-tryptophan and N-acetyl-D-tryptophan were hydrolyzed by heating with hydrochloric acid to yield respectively L-tryptophan and D-tryptophan.

EXAMPLE 10

Resolution of N-Acetyl-DL-Valine

A mixture of 2700 g. of N-acetyl-DL-valine, 3600 g. of L-threo-2-amino-1-(p-methylmercaptophenyl)-1,3-propanediol, and 40 liters of 95% ethanol was warmed to 50° C. in order to effect complete solution of the solid ingredients. The solution was then cooled to 40° C., and it was seeded with a few crystals of the L-threo-2-amino-1-(p-methylmercaptophenyl)-1,3-propanediol salt of N-acetyl-L-valine. The solution was allowed to stand for twenty-four hours at 25° C. with occasional stirring. There was very heavy crystallization of solid from the solution. The mixture was placed on a filter, sucked dry, washed with two liters of cold 95% ethanol, and dried at 50–70° C. There was thus obtained 1900 g. of the L - threo - 2 - amino - 1 - (p - methylmercaptophenyl)-1,3-propanediol salt of N-acetyl-L-valine which melted at 182–184° C.

The filtrate and wash liquid were combined, cooled to 5° C. seedew with a few crystals of the L-threo-2-amino - 1 - (p - methylmercaptophenyl) - 1,3-propanediol salt of N-acetyl-D-valine, and the solution was allowed to stand for twenty-four hours at 5° C. The solid which had separated from solution was then collected on a filter and washed with cold anhydrous ethanol. There was thus obtained 1300 g. of L-threo-2-amino-1-(p-methylmercaptophenyl)-1,3-propanediol salt of N-acetyl-D-valine which melted at 155–158° C.

Additional crops of the L-threo-amine-L-acid and L-threo-amine-D-acid salts were obtained as follows. The filtrate from the crop of L-threo-amine-D-acid salt was concentrated to a volume of fifteen liters by evaporation, seeded with a few crystals of the L-threo-amine-L-acid salt, and the solution was allowed to stand for twenty-four hours at 25° C. The solid which had separated from solution was collected on a filter and dried. There was thus obtained a second crop of 590 g. of the L-threo - 2 - amino - 1 - (p - methylmercaptophenyl) - 1,3-propanediol salt of N-acetyl-L-valine which melted at 183–185° C. The filtrate was cooled to 5° C. for twenty-four hours, and the solid which had separated from solution was collected on a filter. There was thus obtained a second crop of 500 g. of crude L-threo-2-amino-1-(p-methylmercaptophenyl)-1,3-propanediol salt of N-acetyl-D-valine which melted at 154–157° C.

N-Acetyl-L-Valine 2700 g. of the L-threo-2-amino-1-(p-methylmercaptophenyl)1,3-propanediol salt of N-acetyl-L-valine was dissolved in four liters of hot water, the solution was cooled until crystallization of solid began, and 600 ml. of 35% sodium hydroxide solution was added. The solution was then cooled to 5° C. The solid which separated from solution was collected on a filter, washed well with water and then with benzene, and dried at 50° C. There was thus obtained 1525 g. of L-threo-2-amino-1-(p-methylmercaptophenyl)-1,3-propanediol. The filtrate and the aqueous wash were combined and acidified by addition of 600 ml. of concentrated hydrochloric acid, and the solution was saturated with sodium chloride and cooled to 5° C. The solid which separated from solution was collected on a filter, washed with a few ml. of cold water and dried at 70° C. There was thus obtained 1115 g. of N-acetyl-L-valine which melted at 168–169° C. By extraction of the mother liquor with ethyl acetate there was recovered an additional 50 g. of crude N-acetyl-L-valine which melted at 150–158° C.

Recrystallization of the N-acetyl-L-valine from water yielded a purified product melting at 170–171° C. and having $[\alpha]_D^{25}$ −31.2° (c. 4% in water).

N-Acetyl-D-Valine 1950 g. of the L-threo-2-amino-1-(p-methylmercaptophenyl)-1,3-propanediol salt of N-acetyl-D-valine was dissolved in four liters of water, and the solution was mixed with 440 ml. of 35% aqueous sodium hydroxide solution. The solution was then cooled to 10° C. and the solid which separated from solution was collected on a filter. There was thus obtained 1100 g. of L-threo-2-amino - 1 - (p-methylmercaptophenyl)-1,3-propanediol. The filtrate was acidified with 440 ml. of concentrated hydrochloric acid, saturated with sodium chloride, and cooled to 5° C. The solid which separated from solution was collected on a filter, thus yielding 730 g. of N-acetyl-D-valine which melted at 167–169° C.; and a second crop of the same product which weighed 53 g. and melted at 150–160° C. was obtained by making the filtrate alkaline by addition of sodium hydroxide solution, removing the precipitated L-threo-2-amino-1-(p-methylmercaptophenyl)-1,3-propanediol by filtration, and reacidifying the filtrate with hydrochloric acid.

Recrystallization of the N-acetyl-D-valine from water yielded a purified product melting at 170–171° C. and having $[\alpha]_D^{25}$ +31.4° (c. 4% in water).

The N-acetyl-L-valine and N-acetyl-D-valine were hydrolyzed by heating with hydrochloric acid to yield L-valine and D-valine respectively.

EXAMPLE 11

*Resolution of N-Benzoyl-DL-Serine*

1400 g. of N-benzoyl-DL-serine was dissolved in three liters of methanol by heating to boiling and this solution was added to a boiling solution of 1430 g. of L-threo - 2 - amino-1 - (p - methylmercaptophenyl) - 1,3-propanediol in six liters of methanol. The solution was seeded with a few crystals of the L-threo-2-amino-1-(p-methylmercaptophenyl)-1,3-propanediol salt of N-benzoyl-L-serine and then cooled and stirred for two hours at 25° C. The solid which separated from the solution was collected on a filter and washed with ethanol. There was thus obtained 1415 g. of the L-threo-2-amino-1-(p-methylmercaptophenyl)-1,3-propanediol salt of N-benzoyl-L-serine which melted at 170–175° C. This product was slurried in three liters of boiling 95% ethanol and the resulting solution was cooled to 25° C. There separated from solution 1315 g. of the L-threo-2-amino-1-(p-methylmercaptophenyl)-1,3-propanediol salt of N-benzoyl-L-serine which melted at 176–178° C. Concentration of the filtrate to one-quarter of its original volume by evaporation and cooling the concentrated solution yielded a second crop of crude L-threo-2-amino-1-(p-methylmercaptophenyl) - 1,3 - propanediol salt of N-benzoyl-L-serine weighing 20 g. which melted at 170–175° C. The mother liquor from the second crop of the L-threo-amine-L-acid salt was concentrated under reduced pressure by evaporation to a volume of 2.5 liters. This solution was allowed to stand for twenty-four hours at 5° C. and the solid which separated from solution was collected on a filter, washed with cold ethanol, and dried at 50° C. There was thus obtained 1250 g. of crude L - threo - 2 - amino-1-(p-methylmercaptophenyl)-1,3-propanediol salt of N-benzoyl-D-serine as a hydrate which melted at 88–120° C. By concentrating the filtrate and cooling, there was obtained an additional crop of 275 g. of the same hydrate.

Combination of the crops of L-threo-2-amino-1-(p-methylmercaptophenyl)-1,3-propanediol salt of N-benzoyl-D-serine and recrystallization from five liters of hot water by keeping the solution at 25° C. for several hours yielded as a precipitate 1100 g. of the L-threo-2-amino-1-(p-methylmercaptophenyl)-1,3-propanediol salt of N-benzoyl-D-serine as a hydrate which melted at 90–130° C. (A portion of this hydrate was converted to the anhydrous form, which melted at 143–145° C., by slurrying in a 1:1 mixture of ethanol and ether.) Cooling of the filtrate from the 1100 g. crop of the hydrated salt at 5° C. overnight yielded a second crop of 210 g. of the L-threo-amine-D-acid salt hydrate.

The mother liquor from the crops of hydrated salt was made alkaline by treatment with sodium hydroxide solution, thereby precipitating 54 g. of L-threo-2-amino-1-(p-methylmercaptophenyl) - 1,3 - propanediol, and the filtrate from this product was acidified and saturated with sodium chloride and cooled to yield 30 g. of solid consisting chiefly of N-benzoyl-DL-serine.

*N-Benzoyl-L-Serine*

1317 g. of the L-threo-2-amino-1-(p-methylmercaptophenyl)-1,3-propanediol salt of N-benzoyl-L-serine was suspended in three liters of hot water and this mixture was mixed with a stoichiometrically equivalent quantity of concentrated hydrochloric acid (265 ml.). The clear solution thus obtained was cooled to 20° C. and was then made alkaline by rapidly adding, with strong stirring, 525 ml. of 35% aqueous sodium hydroxide solution. A heavy precipitate of L-threo-2-amino-1-(p-methylmercaptophenyl)-1,3-propanediol separated from the solution rapidly. After the mixture had been cooled to 10–15° C., the precipitated solid was collected on a filter, washed with 300 ml. of cold water and then with a few ml. of benzene, and dried. There was thus obtained about 650 g. of L-threo-2-amino-1-(p-methylmercaptophenyl)-1,3-propanediol. The aqueous filtrates were combined and acidified by mixing with 270 ml. of concentrated hydrochloric acid, and the solution was saturated with sodium chloride. The solution was then cooled to 5° C. The solid which separated from solution was collected on a filter, washed with a few ml. of ice water, and dried at 50° C. There was thus obtained 575 g. of N-benzoyl-L-serine which melted at 145–148° C. Recrystallization of this product from three parts by weight of isopropyl alcohol yielded 520 g. of N-benzoyl-L-serine which melted at 148–149° C. The filtrate was made alkaline by addition of sodium hydroxide solution, a small crop of L-threo-2-amino-1-(p-methylmercaptophenyl)-1, 3-propanediol which separated from solution was removed by filtration, and the filtrate was acidified, thereby causing the precipitation of another 50 g. of N-benzoyl-L-serine.

*N-Benzoyl-D-Serine*

880 g. of L-threo-2-amino-1-(p-methylmercaptophenyl)-1,3-propanediol salt of N-benzoyl-D-serine (hydrate) was trated in a manner similar to that described above for the treatment of the N-benzoyl-L-serine salt, and there was thus obtained 355 g. of N-benzoyl-D-serine which melted at 148–150° C.

EXAMPLE 12

*Resolution of N-Benzoyl-DL-alpha-Methylserine*

22.3 g. of N-benzoyl-DL-alpha-methylserine and 21.3 g. of L-threo-2-amino-1-(p-methylmercaptophenyl)-1,3-propanediol were dissolved together in 100 ml. of methanol. Crystallization of solid from this solution was initiated by scratching the inside wall of the container below the surface of the solution. After the solution had stood for several hours at 25° C., a very heavy separation of solid from the solution had taken place. This solid was collected on a filter and washed with a few ml. of cold 95% ethanol and dried at 90° C. There was thus obtained 17.6 g. of the L-threo-2-amino-1-(p-methylmercaptophenyl)-1,3-propanediol salt of N-benzoyl-L-alpha-methylserine which melted at 175–177° C. The melting point of the product remained unchanged after recrystallization from 150 ml. of 95% ethanol.

The filtrate was evaporated under reduced pressure, and the residue thus obtained was dissolved in 100 ml. of water containing 5 ml. of concentrated hydrochloric acid. To the clear solution there was added 10 ml. of 35% aqueous sodium hydroxide solution, thus causing the precipitation of L-threo-2-amino-1-(p-methylmercaptophenyl)-1,3-propanediol. The mixture was cooled to 5° C. and the precipitated L-threo-2-amino-1-(p-methylmercaptophenyl)-1,3-propanediol was collected on a filter. The filtrate was acidified by mixing with 7 ml. of concentrated hydrochloric acid and the acidified solution was seeded with a few crystals of N-benzoyl-DL-alpha-methylserine. The seeded solution was allowed to stand at 5–10° C. for several hours and then the solid which had separated from solution was collected on a filter. There was thus obtained 4 g. of N-benzoyl-DL-alpha-methylserine which melted at 158–160° C. The filtrate was saturated with sodium chloride and allowed to stand overnight at 5° C. The solution was then filtered to collect 7.5 g. of N-benzoyl-D-alpha-methylserine which had separated from the solution. This product melted at 127–129° C.

N-Benzoyl-L-Alpha-Methylserine 475 g. of the L-threo-2-amino-1-(p-methylmercaptophenyl)-1,3-propanediol salt of N-benzoyl-L-alpha-methylserine (obtained, in the manner indicated above, from 637 g. of N-benzoyl-DL-alpha-methylserine) was dissolved in one liter of water to which had been added 90 ml. of concentrated hydrochloric acid. This solution was cooled and made alkaline by addition of 180 ml. of 35% sodium hydroxide solution. There was an essentially quantitative precipitation of L-threo-2-amino-1-(p-methylmercaptophenyl)-1,3-propanediol, and this product was collected on a filter. The filtrate was acidified by the addition of 92 ml. of concentrated hydrochloric acid and the acidified solution was saturated with sodium chloride and allowed to stand for several hours at 0° C. The crystalline solid, N-benzoyl-L-alpha-methylserine, which had separated from solution was collected on a filter. The filtrate was extracted several times with ethyl acetate to recover a further quantity of N-benzoyl-L-alpha-methylserine. The initial crop of crystalline product was combined with the material obtained by the extraction procedure, and the product was recrystallized from ethyl acetate. There was thus obtained 220 g. of N-benzoyl-L-alpha-methylserine which melted at 128–130° C.

N-Benzoyl-D-Alpha-Methylserine

This product was obtained from the L-threo-2-amino-1-(p-methylmercaptophenyl)-1,3-propanediol salt of N-benzoyl-D-alpha-methylserine in a manner similar to that described above for the preparation of N-benzoyl-L-alpha-methylserine.

When N-benzoyl-L-alpha-methylserine was refluxed with 34% hydrobromic acid, there was obtained L-alpha-methylserine which melted at 284–285° C. (dec.) and had $[\alpha]_D^{25}$ −5.4° (c. 1% in water). By hydrolysis of N-benzoyl-D-alpha-methylserine in similar fashion, there is obtained D-alpha-methylserine.

EXAMPLE 13

Resolution of Racemic N-Acetylphenylalanine 1.0 kg. of N-acetyl-DL-phenylalanine and 1.03 kg. of L-threo-2-amino-1-(p-methylmercaptophenyl)-1,3-propanediol were dissolved in a hot mixture of 14 liters of hot methanol and 1.4 liters of water. This solution was cooled to 20° C., seeded by the addition of a few crystals of the L-threo-2-amino-1-(p-methylmercaptophenyl)-1,3-propanediol salt of N-acetyl-L-phenylalanine, and allowed to stand for three hours at 5° C. The crystalline solid which had separated from solution was collected on a filter, washed with methanol and dried at 7°. C. There was thus obtained 490 g. of the L-threo-2-amino-1-(p-methylmercaptophenyl)-1,3-propanediol salt of N-acetyl-L-phenylalanine which melted at 183–186° C. The melting point of the product remained unchanged after it had been recrystallized from water.

The filtrate was seeded with a few crystals of the L-threo-2-amino-1-(p-methylmercaptophenyl)-1,3-propanediol salt of N-acetyl-D-phenylalanine and allowed to stand overnight at 5° C. The solid which had separated from the solution was collected on a filter and there was thus obtained 620 g. of the L-threo-2-amino-1-(p-methylmercaptophenyl)1,3-propanediol salt of N-acetyl-D-phenylalanine which melted at 172–175° C. After recrystallization from 95% ethanol, the product melted at 178–180° C.

N-Acetyl-L-Phenylalanine

By regeneration from the L-threo-2-amino-1-(p-methylmercaptophenyl)-1,3-propanediol salt, there was produced N-acetyl-L-phenylalanine which melted at 170–172° C.

N-Acetyl-D-Phenylalanine

This product, M.P. 168–170° C., is obtained from the L - threo - 2 - amino - 1 - (p-methylmercaptophenyl)-1,3-propanediol salt of N-acetyl-D-phenylalanine by precipitating and removing the L-threo-2-amino-1-(p-methylmercaptophenyl)-1,3-propanediol and acidification of the filtrate.

EXAMPLE 14

Resolution of Racemic N-Acetylisoleucine 183 g. of N-acetyl-DL-isoleucine and 225 g. of L-threo-2-amino-1-(p - methylmercaptophenyl) - 1,3 - propanediol were dissolved together in three liters of boiling 95% ethanol and the solution was allowed to stand overnight at 25° C. The solid which had separated from solution was then collected on a filter. There was thus obtained 165 g. of the L-threo-2-amino-1-(p-methylmercaptophenyl)-1,3-propanediol salt of N-acetyl-L-isoleucine which melted at 196–198° C. From this salt there was regenerated N-acetyl-L-isoleucine which melted at 148–150° and had $[\alpha]_D^{25}$ −8.0° (c. 2% in water).

From the filtrate, by evaporation, dissolving the residue in water and seeding, there is obtained the L-threo-2-amino-1-(p-methylmercaptophenyl)-1,3 - propanediol salt of N-acetyl-D-isoleucine; from this salt N-acetyl-D-isoleucine, M.P. 148–150° C., is readily obtained.

EXAMPLE 15

Resolution of Racemic N-Benzoylthreonine 33 g. of L-threo-2-amino-1-(p-methylmercaptophenyl)-1,3-propanediol and 34.6 g. of N-benzoyl-DL-threonine were dissolved together in 500 ml. of methanol and the solution was allowed to stand overnight at 5° C. The crystalline solid which had separated from solution was collected on a filter and washed with ethanol. There was thus obtained 31.3 g. of the L-threo-2-amino-1-(p-methylmercaptophenyl)-1,3-propanediol salt of N-benzoyl-L-threonine which melted at 184–186° C. Recovery of the diastereomeric L-threo-amine-D-acid-salt from the filtrate and conversion of the diastereomeric salts to N-benzoyl-L-threonine and N-benzoyl-D-threonine can be carried out in substantially the manner described above in Example 11 with regard to the adjacently homologous N-benzoylserine salts.

As will be readily appreciated by those skilled in the art, the use of the D-threo-amines instead of the L-threo-amines as the resolving agent in the above examples 1–15 produces D-threo-amine salts of the respective D- and L-forms of the N-acyl-alpha-aminomonocarboxylic acid which have reversed solubility relationships as compared with the corresponding L-threo-amine salts. Thus, for instance, when D-threo-2-amino - 1 - (p - methylsulfonylphenyl)-1,3-propanediol is employed in the process of Example 1, the initial crop of the diastereomeric salt is the D-threo-amine salt of N-acetyl-L-valine, the D-threo-amine salt of N-acetyl-D-valine being the more soluble of the diastereomeric pair. And, when D-threo-2-amino-1-(p-methylmercaptophenyl)-1,3-propanediol is employed in the process of Example 9, the initial crop of disastereomeric salt is the D-threo-amine salt of N-acetyl-D-tryptophan, the D-threo-amine salt of N-acetyl-L-tryptophan being the more soluble of the disastereomeric pair.

PART II.—MONOBASIC SALTS OF D- AND L-THREO- 2 - AMINO - 1- (p-METHYLMERCAPTOPHENYL)-1,3-PROPANEDIOL AND OF D- AND L-THREO-2-AMINO-1- (p - METHYLSULFONYLPHENYL) - 1,3 - PROPANEDIOL, RESPECTIVELY, WITH D- AND L-ALPHA-AMINO-LOWER ALIPHATIC DICARBOXYLIC ACIDS AND USE IN RESOLUTIONS

An object of Part II of this invention is the provision of methods, and intermediates useful in said methods, for obtaining the optically active forms of threo-2-amino-1-(p-methylmercaptophenyl)-1,3-propanediol and of alpha-amino-lower aliphatic dicarboxylic acids from the corresponding optically inactive racemic forms of these compounds.

I have discovered that the diastereomeric salts formed by interaction of the group consisting of an optically active threo-2-amino-1-(p - methylmercaptophenyl) - 1,3-propanediol and an optically active threo-2-amino-1-(p-methylsulfonylphenyl)-1,3-propanediol with one equivalent of a racemic alpha-amino-lower aliphatic dicarboxylic acid unexpectedly have widely differing solubilities in certain solvents which make these salts valuable compounds for use in the resolution of the racemic acid into the D and L-forms thereof. As another aspect of this same discovery, I have found that the diastereomeric monobasic salts formed by interaction of an optically active alpha-amino-lower aliphatic dicarboxylic acid with one equivalent of racemic threo-2-amino-1-(p-methylmercaptophenyl) - 1,3 - propanediol unexpectedly have widely differing solubilities in certain solvents which make these salts useful for the resolution of the racemic amine into the D- and L-forms thereof.

For the resolution of a racemic alpha-amino-lower aliphatic dicarboxylic acid of the class consisting of glutamic acid, aspartic acid, hydroxyglutamic acid, and alpha-methyl-glutamic acid, the process of my invention comprises: dissolving the racemic alpha-amino-lower aliphatic dicarboxylic acid with an equimolecular quantity of an optically active threo-2-amino-1-(p-methylmercaptophenyl)-1,3-propanediol or of an optically active threo - 2 - amino - 1 - (p - methylsulfonylphenyl) - 1,3-propanediol in a solvent of the class consisting of water-soluble lower alkanols, water, and mixtures thereof; separating the diastereomeric monobasic salts thus formed by fractional crystallization; and regenerating at least one, and both if desired, of the D-alpha-amino-lower aliphatic dicarboxylic acid and L-alpha-amino-lower aliphatic dicarboxylic acid from the respective separated diastereomeric salts.

For the resolution of racemic threo-2-amino-(p-methylmercaptophenyl)-1,3-propanediol, the process of my invention comprises: dissolving the racemic threo-2-amino-1-(p-methylmercaptophenyl) - 1,3 - propanediol with an equimolecular quantity of an optically active alpha-amino-lower aliphatic dicarboxylic acid of the class consisting of glutamic acid, aspartic acid, hydroxyglutamic acid, and alpha-methylglutamic acid in a solvent of the class consisting of water-soluble lower alkanols, water, and mixtures thereof; separating the disastereomeric monobasic salts thus formed by fractional crystallization; and regenerating at least one, and both if desired, of the D-threo-2-amino - 1 - (p - methylmercaptophenyl) - 1,3-propanediol and L-threo-2-amino-1-(p-methylmercaptophenyl)-1,3-propanediol from the respective separated diastereomeric salts.

The racemic and the D- and L-forms of the alpha-omino-lower aliphatic dicarboxylic acids used in the practice of my invention are of course old compounds which can be obtained by methods described in the prior art. The racemic and D- and L-forms of threo-2-amino-1-(p-methylmercaptophenyl)-1,3-propanediol and of threo-2 - amino - 1 - (p - methylsulfonylphenyl) - 1,3 - propanediol are obtained in the manner indicated hereinabove.

When the natural form of the amino acid is the desired form, as will usually be the case, there is a definite advantage in having the salt of the preferred optical form separate as the initial crop in the fractional crystallization step. To this purpose when using an optically active threo - 2 - amino - 1 - (p - methylmercaptophenyl) - 1,3-propanediol, from an economic standpoint I prefer to employ the L-form (which is dextrorotary), since the diastereomeric monobasic L-threo-amine salt of the optically active form corresponding to that of the natural amino acid is less soluble in the solvents employed in the process of my invention in each instance than is the diastereomeric monobasic D-threo-amine salt. Moreover, as already indicated the L-form is a by-product in obtaining the enantiomeric D-form (which is levorotary) which is directly useful for the preparation of antibacterially active N-acyl derivatives, i.e., the N-acyl derivatives of the L-form have no practical utility as antibacterial agents.

On the other hand, when an optically active threo-2-amino - 1 - (p - methylsulfonylphenyl) - 1,3 - propanediol is employed as the resolving amine, I prefer to use the D-form since the diastereomeric monobasic D-threo-amine salt of the optically active form corresponding to that of the natural amino acid is less soluble in the solvents employed in the process of my invention in each instance than is the diastereomeric monobasic D-threo-amine salt. It will be appreciated that when the L-threo-amine is employed, the less soluble monobasic L-threo-amine-D-acid salt crystallizes from solution first and the monobasic L-threo-amine-L-acid salt is recovered from the mother liquor.

L-glutamic acid is relatively cheap, being obtained in good yield from natural sources, and the use of this compound in accordance with my invention provides a simple and economical method for resolving racemic threo-2 - amino - 1 - (p - methylmercaptophenyl) - 1,3 -propanediol to obtain the D-threo-amine, which is a valuable intermediate for the preparation of antibacterial agents, and the enantiomeric L-threo-amine, which is useful as a resolving agent. On the other hand, D-glutamic acid, which is an expensive compound, is conveniently and economically obtained from synthetic racemic glutamic acid by using in the process of my invention the L-threo-amine.

A particular advantage of these processes of resolution of Part II of my invention is the unexpectedly sharp and clean separation of the diastereomeric salts in the fractional crystallization step in each case which results from the widely differing solubilities of these novel salts in the specified solvents. A further advantage is the ease and completeness of separation and recovery of the resolving agent.

The water-soluble lower alkanols which can be employed as a solvent medium include methanol, ethanol, the propanols, and the butanols. I generally prefer methanol or ethanol when an alkanol is used.

My novel resolution processes of Part II of my invention can be carried out in several different ways, the particular mode of operation being a matter of convenience which may depend on the choice of the compound to be resolved. Thus, for example, the racemic compound to be resolved and the optically active resolving agent are dissolved together in hot lower alkanol, such as methanol or ethanol, or water or mixtures thereof, and the solution thus obtained is cooled and if necessary concentrated by evaporation until the solution is supersaturated with respect to the less soluble of the two diastereomeric salts, and it preferentially crystallizes from solution. In some cases, when water or an alkanol-water mixture is used as the solvent, the initiation of crystallization can be brought about by addition of alkanol to the solution rather than, or in addition to, cooling the solution. Optionally, but advantageously, the crystallization processes are aided by the conventional expedient of seeding the solution with a few crystals of the compound which is expected to separate from solution.

The first crop of the less soluble diastereomeric salt which crystallizes from solution is generally of high quality and in good yield. The recovery of the more soluble diastereomeric monobasic salt from the mother liquor is carried out by evaporating the solution to dryness, thus producing a residue of the desired salt in crude form which can then be purified or alternatively, the mother liquor is concentrated by evaporation, thereby causing the separation of a crop of the desired salt. When desired, additional crops of the two diastereomeric monobasic salts can be obtained in simple fashion from the mother liquors as illustrated hereinafter in the detailed examples.

The regeneration of or release of the D- and L-forms of the threo - 2 - amino - 1 - (p - methylmercaptophenyl)-1,3-propanediol, or of the alpha-amino-lower aliphatic dicarboxylic acid, as the case may be, from the respective separated diastereomeric monobasic salts is readily effected by mixing with a slight excess of an acid or base in the conventional manner for regeneration of organic amines and weak acids from their salts with each other. The recovery of the desired final products as well as of the resolving agent is generally in good yield and quality.

The novel monobasic salts of the optically active forms of threo-2-amino-1-(p-methylmercaptophenyl)-1,3-propanediol and of threo-2-amino-1-(p-methylsulfonylphenyl)-1,3-propanediol, respectively, with optically active alpha-amino-lower aliphatic dicarboxylic acids which are obtained as the intermediates in my invention are generally stable, non-hydroscopic, white crystalline solids which are easily isolated in pure form and which have sharp melting points.

Part II of my invention is illustrated by the following examples without, however, being limited thereto.

EXAMPLE 16

*Resolution of Racemic Glutamic Acid*

2.08 g. of DL-glutamic acid and 2.8 g. of L-threo-2-amino - 1 - (p - methylmercaptophenyl) - 1,3 -propanediol were dissolved together in 20 ml. of boiling water. This solution was diluted with 100 ml. of methanol and allowed to stand for several hours at 25° C. The crystalline solid which had separated from solution was collected on a filter, washed with methanol, and dried at 70° C. There was thus obtained 1.8 g. of the monobasic L-threo - 2 - amino - 1 (p -methylmercaptophenyl) - 1,3-propanediol salt of L-glutamic acid, having the molecular formula $C_{10}H_{15}NO_2S.C_5H_9NO_4$, which melted at 195–197° C. After recrystallization from 80% methanol, the salt melted at 198-200° C. This salt was dissolved in water and sodium hydroxide solution was added to the solution to precipitate L-threo-2-amino-1-(p-methylmercaptophenyl)-1,3-propanediol. This solid product was collected on a filter and the filtrate was acidified to pH 3.5 to precipitate L-glutamic acid.

The filtrate from the collection of the monobasic L-threo-amine salt of L-glutamic acid described above was concentrated and seeded to yield the monobasic L-threo-2 - amino - 1 - (p-methylmercaptophenyl) - 1,3 - propanediol salt of D-glutamic acid. From this latter salt, D-glutamic acid is obtained in a manner similar to that described above for obtaining L-glutamic acid.

EXAMPLE 17

*Resolution of Racemic Threo-2-Amino-1-(p-Methylmercaptophenyl)-1,3-Propanediol*

407 g. of DL-threo-2-amino-1-(p-methylmercaptophenyl)-1,3-propanediol was dissolved in 1500 ml. of hot methanol. 1500 ml. of water and 280 g. of L-glutamic acid were then added to the solution and the mixture was stirred and warmed until all solid had dissolved. To the solution thus obtained there was added rapidly six liters of methanol. Crystallization of solid from the solution began immediately and was complete after stirring the mixture for four to five hours at 25° C. The crystalline solid which had separated from solution was then collected on a filter, slurried on the filter with a mixture of 100 ml. of water and 500 ml. of methanol, and the solid was sucked dry on the filter and then dried at 70° C. There was thus obtained 320 g. of monobasic L-threo-2-amino-1-(p-methylcercaptophenyl)-1,3-propanediol salt of L-glutamic acid, having the molecular formula $C_{10}H_{15}NO_2S.C_5H_9NO_4$, which melted at 196–199° C. After recrystallization from 80% methanol, the salt melted at 198–200° C. This salt was identical with the monobasic L-threo-amine-L-acid salt described above in Example 1.

The filtrate from the monobasic L-threo-amine salt of L-glutamic acid was evaporated under reduced pressure to a volume of about 750 ml., and the concentrated solution of the monobasic D-threo-2-amino-1-(p-methylmercaptophenyl)-1,3-propanediol salt of L-glutamic acid thus obtained was then diluted to a volume of 1200 ml. with water. This solution was mixed with 100 ml. of 35% aqueous sodium hydroxide solution at 10° C. After the mixture had stood for about one hour at 5° C., the crystalline solid which had separated from solution was collected on a filter, washed with a few ml. of ice water and then with a few ml. of benzene, and dried at 70° C. There was thus obtained 200 g. of the crude D-threo-amine which melted at 140–150° C. (The aqueous filtrate was retained for recovery of L-glutamic acid as described below.) This crude amine was dissolved in 2.5 liters of boiling isopropyl alcohol and the solution was allowed to stand for several hours at 5° C. The crystalline solid which had separated from solution was collected on a filter, washed with a few ml. of cold isopropyl alcohol, and dried at 70° C. There was thus obtained 161 g. of D-threo-2-amino-1-(p-methylmercaptophenyl)-1,3-propanediol which melted at 151–154° C.

The L-threo-amine was regenerated from the monobasic L-glutamic acid salt in the following manner. 320 g. of the monobasic L-threo-2-amino-1-(p-methylmercaptophenyl)-1,3-propanediol salt of L-glutamic acid was suspended in 1500 ml. of hot water and to this suspension there was added slowly 100 ml. of 35% aqueous sodium hydroxide solution. The mixture was stirred for one hour while cooling to 5° C. The solid which separated from solution was collected on a filter, washed with a few ml. of ice water and with a few ml. of benzene, and dried at 70° C. There was thus obtained 200 g. of crude L-threo-amine. Recrystallization of this product from isopropyl alcohol yielded 159 g. of L-threo-2-amino-1-(p-methylmercaptophenyl)-1,3-propanediol which melted at 151–154° C.

By combining the isopropyl alcohol mother liquors from the purification of the L-threo-amine and the D-threo-amine and concentration of the solution, there was recovered 56 g. of the racemic threo-amine which melted at 124–127° C.

The aqueous liquors from the collection of the L-threo-amine and D-threo-amine above described were combined and acidified by treatment with 190 ml. of concentrated hydrochloric acid and 20 ml. of acetic acid, and the acidified solution was allowed to stand overnight (about sixteen hours) at 5° C. The solid which had separated from solution was then collected on a filter, washed with cold water, and dried at 70° C. There was thus recovered 228 g. of nearly pure L-glutamic acid. The mother liquors were saturated with sodium chloride and then made alkaline by treatment with 35% aqueous sodium hydroxide solution, thereby causing the precipitation of a further crop of 12 g. of the racemic threo-amine.

EXAMPLE 18

*Resolution of Racemic Aspartic Acid*

2.5 kg. of DL-aspartic acid and 4.0 kg. of L-threo-2-amino-1-(p-methylmarcaptophenyl)-1,3-propanediol were dissolved together in ten liters of water by warming to 50° C. The solution was cooled to 5° C., seeded with the monobasic L-threo-2-amino-1-(p-methylmercaptophenyl)-1,3-propanediol salt of L-aspartic acid, and stirred slowly in an ice bath for three-four hours. The heavy precipitate which separated from solution was collected on a filter, washed with two 200 ml. portions of ice water and dried at 60° C. There was thus obtained 2.31 kg. of the monobasic L-threo-2-amino-1-(p-methylmercaptophenyl)-1,3- propanediol salt of L-aspartic acid, having the molecular formula $C_{10}H_{15}NO_2S.C_4H_7NO_4$, which melted at 194–195° C.

The filtrate was diluted with an equal volume of methanol, seeded with the L-threo-2-amino-1-(p-methylmercaptophenyl-1,3-propanediol salt of D-aspartic acid and allowed to stand overnight at 5° C. The crystalline solid which had separated from solution was collected on a filter, washed with a few ml. of cold 50% methanol and dried at 80° C. There was thus obtained 2.52 kg. of the monobasic L-threo-2-amino-1-(p-methylmercaptophenyl)-1,3-propanediol salt of D-aspartic acid, having the molecular formula $C_{10}H_{15}NO_2S.C_4H_7NO_4$, which melted at 180–190° C.

The filtrate from the crop of monobasic L-threo-amine-D-acid-salt was evaporated to a volume of five liters and then treated with 370 ml. of concentrated hydrochloric acid. The solution was stirred for several hours at 5° C. and then the solid which had separated from solution was collected on a filter, washed with a few ml. of cold water and dried at 70° C. There was thus recovered 580 g. of DL-aspartic acid. The filtrate was retained for recovery of L-threo-2-amino-1-(p-methylmercaptophenyl)-1,3-propanediol.

*L-Aspartic Acid*

2.3 kg. of the monobasic L-threo-2-amino-1-(p-methylmercaptophenyl)-1,3-propanediol salt of L-aspartic acid was dissolved in five liters of water at 40–50° C. and to the resulting solution there was added 565 ml. of 35% aqueous sodium hydroxide solution. After cooling the solution to 5°, the L-threo-2-amino-1-(p-methylmarcaptophenyl)-1,3-propanediol which had separated from solution was collected on a filter, washed with two one-liter portions of cold water and then with a few ml. of benzene. There was thus obtained 1340 g. of L-threo-2-amino-1-(p-methylmarcaptophenyl)-1,3-propanediol. The filtrate was acidified by mixing with 570 ml. of concentrated hydrochloric acid and the acidified solution was allowed to stand overnight at 5° C. The L-aspartic acid which had separated from solution was collected on a filter and dried at 70° C. This product weighed 765 g. and had $[\alpha]_D^{25}$ +24.1° (c. 2% in 6 N hydrochloric acid). Crystallization of this product from eighteen liters of water yielded 705 g. of L-aspartic acid.

*D-Aspartic Acid*

When the monobasic L-threo-2-amino-1-(p-methylmercaptophenyl)-1,3-propanediol salt of D-aspartic acid was treated in a manner similar to that described for the monobasic L-threo-amine-L-acid salt, there was obtained 845 g. of crude D-aspartic acid which had $[\alpha]_D^{25}$ −19.2° (c. 2% in 6 N hydrochloric acid). Recrystallization of this product from twenty liters of water, with filtering at 25° C., yielded 552 g. of D-aspartic acid which had $[\alpha]_D^{25}$ −24.4° (c. 2% in 6 N hydrochloric acid). Cooling the mother liquor from this recrystallization overnight at 5° yielded a further crop of 70 g. of crude D-aspartic acid which on recrystallization gave 62 g. of pure D-aspartic acid.

The appropriate forms of hydroxyglutamic acid and alpha-methylglutamic acid can be substituted in the above examples as the alpha-amino-lower aliphatic dicarboxylic acid with similar satisfactory results.

EXAMPLE 19

*Resolution of Racemic Glutamic Acid*

14.7 g. of DL-glutamic acid and 24.6 g. of D-threo-2-amino-1-(p-methylsulfonylphenyl)-1,3-propanediol were dissolved together in 40 ml. of water and the solution was seeded with a few crystals of the monobasic D-threo-2-amino-1-(p-methylsulfonylphenyl)-1,3-propanediol salt of L-glutamic acid, and allowed to stand overnight at 5° C. The crystalline solid which separated from solution, which was the monobasic D-threo-2-amino-1-(p-methylsulfonylphenyl)-1,3-propanediol salt of L-glutamic acid having the molecular formula $C_{10}H_{15}NO_4S.C_5H_9NO_4$, was collected on a filter, washed with 95% ethanol and dried. This salt melted at 125–127° C. Alternatively, there was employed as the solvent 200 ml. of 80% ethanol. From the filtrate there is obtained the monobasic D-threo-2-amino-1-(p-methylsulfonylphenyl)-1,3-propanediol salt of D-glutamic acid having the same molecular formula as its diastereomer above. By mixing an aqueous solution of each of these salts with a slight excess of hydrochloric acid, there was obtained a precipitate of L-glutamic acid and D-glutamic acid, respectively. The D-threo-2-amino-1-(p-methylsulfonylphenyl)-1,3-propanediol is recovered in high yield from the mother liquors by concentration and then making the concentrated solution alkaline by treatment with sodium hydroxide solution.

EXAMPLE 20

*Resolution of Racemic Aspartic Acid*

1.33 g. of DL-aspartic acid and 2.46 g. of D-threo-2-amino-1-(p-methylsulfonylphenyl)-1,3-propanediol were dissolved together in 5-ml. of water. The solution was seeded, and allowed to stand for one hour at 25° C. The crop of the monobasic D-threo-2-amino-1-(p-methylsulfonylphenyl)-1,3-propanediol salt of L-aspartic acid, having the molecular formula $C_{10}H_{15}NO_4S.C_4H_7NO_4$, which crystallized from solution was collected on a filter, washed with 95% ethanol and dried at 70° C. The salt melted at 198–200° C. By mixing an aqueous solution of this salt with a slight excess of hydrochloric acid, there was obtained a precipitate of L-aspartic acid, M.P. 270° C., $[\alpha]_D^{25}$ +24.5° (c. 2% in 6 N hydrochloric acid).

The monobasic D-threo-2-amino-1-(p-methylsulfonylphenyl)-1,3-propanediol salt of D-aspartic acid, having the molecular formula $C_{10}H_{15}NO_4.C_4H_7NO_4$, was recovered from the filtrate. An aqueous solution of this salt was converted by mixing with a slight excess of hydrochloric acid to yield a precipitate of D-aspartic acid, M.P. 270° C., $[\alpha]_D^{25}$ −24.5° (c. 2% in 6 N hydrochloric acid).

The appropriate forms of hydroxyglutamic acid and alpha-methylglutamic acid can be substituted in the above examples as the alpha-amino-lower aliphatic dicarboxylic acid with similar satisfactory results The prefixes "D-" and "L-" designating the optically active forms of the amino acids mentioned in this specification and in the claims are used in conformance with the nomenclature rules of the International Union of Pure and Applied Chemistry as set forth at pages 4522–4526 of "Chemical and Engineering News," vol. 30, No. 43 (October 27, 1952).

This application is a continuation-in-part of my prior pending applications Serial No. 450,811, filed August 18, 1954 and Serial No. 742,485, filed June 17, 1958, the latter application being a continuation-in-part of my earlier filed applications Serial Nos. 450,808, 450,810, and 450,812, all filed August 18, 1954 and all co-pending with application Serial No. 742,485 and all now abandoned.

I claim:

1. In a process for resolving a racemic N-acyl-alpha-amino-monocarboxylic acid of the class consisting of N-acyl-alpha-amino-lower alkanoic acids, N-acyl-alpha-amino-beta-hydroxy-lower alkanoic acids, N-acyl-phenylalanines, and N-acyltryptophans, wherein acyl represents a radical of the class consisting of benzoyl and lower alkanoyl, the steps which comprise: dissolving the racemic N-acyl-alpha-amino-monocarboxylic acid with an equimolecular quantity of a member of the group consisting of an optically active threo-2-amino-1-(p-methylmercaptophenyl)-1,3-propanediol and an optically active threo-2-amino-1-(p-methylsulfonylphenyl)-1,3-propanediol in a solvent of the class consisting of water-soluble lower alkanols, water, and mixtures thereof; and separating the diasteromeric salts thus formed by fractional crystallization.

2. The process for resolving a racemic N-lower alkanoyl-alpha-amino-lower alkanoic acid which comprises: dissolving the racemic N-lower alkanoyl-alpha-amino-lower alkanoic acid with an equimolecular quantity of an optically active threo-2-amino-1-(p-methylmercaptophenyl)-1,3-propanediol in a mixture of water and a water-soluble lower alkanol; separating the diastereomeric salts thus formed by fractional crystallization; and regenerating at least one of the N-lower alkanoyl-D-alpha-amino-lower alkanoic acid and N-lower alkanoyl-L-alpha-amino-lower alkanoic acid from the respective separated diastereomeric salt.

3. The process for resolving a racemic N-lower alkanoyl-alpha-amino-lower alkanoic acid which comprises: dissolving the racemic N-lower alkanoyl-alpha-amino-lower alkanoic acid with an equimolecular quantity of an optically active threo-2-amino-1-(p-methylsulfonylphenyl)-1,3-propanediol in a water-soluble lower alkanol; separating the diastereomeric salts thus formed by fractional crystallization; and regenerating at least one of the N-lower alkanoyl-D-alpha-amino-lower alkanoic acid and N-lower alkanoyl-L-alpha-amino-lower alkanoic acid from the respective separated diastereomeric salt.

4. The process for resolving racemic N-acetylvaline which comprises: dissolving racemic N-acetylvaline with an equimolecular quantity of an optically active threo-2-amino-1-(p-methylsulfonylphenyl) - 1,3 - propanediol in methanol; separating the diastereomeric salts thus formed by fractional crystallization; and regenerating at least one of N-acetyl-D-valine and N-acetyl-L-valine from the respective separated diastereomeric salt.

5. The process for resolving racemic N-acetylisoleucine which comprises: dissolving racemic N-acetylisoleucine with an equimolecular quantity of an optically active threo-2 - amino - 1 - (p-methylmercaptophenyl) - 1,3-propanediol in a mixture of water and a water-soluble lower alkanol; separating the diastereomeric salts thus formed by fractional crystallization; and regenerating at least one of N-acetyl-D-isoleucine and N-acetyl-L-isoleucine from the respective separated diastereomeric salt.

6. The process for resolving N-acetyltryptophan which comprises: dissolving racemic N-acetyltryptophan with an equimolecular quantity of an optically active threo-2-amino-1-(p-methylmercaptophenyl)-1,3-propanediol in a mixture of water and methanol; separating the diastereomeric salts thus formed by fractional crystallization; and regenerating at least one of N-acetyl-D-tryptophan and N-acetyl-L-tryptophan from the respective separated diastereomeric salt.

7. The process for resolving N-acetyltryptophan which comprises: dissolving racemic N-acetyltryptophan with an equimolecular quantity of an optically active threo-2-amino-1-(p-methylmercaptophenyl) - 1,3 - propanediol in water; separating the diastereomeric salts thus formed by fractional crystallization; and regenerating at least one of N-acetyl-D-tryptophan and N-acetyl-L-tryptophan from the respective separated diastereomeric salt.

8. The process for resolving racemic N-benzoylserine which comprises: dissolving racemic N-benzoylserine with an equimolecular quantity of an optically active threo-2-amino-1-(p - methylmercaptophenyl) - 1,3 - propanediol in a mixture of water and methanol; separating the diastereomeric salts thus formed by fractional crystallization; and regenerating at least one of N-benzoyl-D-phan and N-acetyl-L-tryptophan from the respective separated diastereomeric salt.

9. The process for resolving a racemic N-lower alkanoylmethionine which comprises: dissolving the racemic N-lower alkanoylmethionine with an equimolecular quantity of an optically active threo-2-amino-1-(p-methylsulfonylphenyl)-1,3-propanediol in a water-soluble lower alkanol; separating the diastereomeric salts thus formed by fractional crystallization; and regenerating at least one of the N-lower alkanoyl-D-methionine and N-lower alkanoyl-L-methionine from the respective separated diastereomeric salt.

10. The process for resolving racemic N-acetylmethionine which comprises: dissolving racemic N-acetylmethionine with an equimolecular quantity of an optically active threo-2-amino-1-(p-methylsulfonylphenyl-1,3-propanediol in methanol; separating the diastereomeric salts thus formed by fractional crystallization; and regenerating at least one of N-acetyl-D-methionine and N-acetyl-L-methionine from the respective separated diastereomeric salt.

11. The process for resolving racemic N-acetylphenylalanine which comprises: dissolving N-acetylphenylalanine with an equimolecular quantity of an optically active threo-2-amino-1-(p - methylmercaptophenyl) - 1,3 - propanediol in a mixture of water and ethanol; separating the diastereomeric salts thus formed by fractional crystallization; and regenerating at least one of N-acetyl-D-phenylalanine and N-acetyl-L-phenylalanine from the respective separated diastereomeric salt.

12. The process for resolving a racemic N-benzoyl-alpha-amino-beta-hydroxy-lower alkanoic acid which comprises: dissolving the racemic N-benzoyl-alpha-amino-beta-hydroxy-lower alkanoic acid with an equimolecular quantity of an optically active threo-2-amino-1-(p-methylsulfonylphenyl)-1,3-propanediol in a mixture of water and a water-soluble lower alkanol; separating the diastereomeric salts thus formed by fractional crystallization; and regenerating at least one of the N-benzoyl-D-alpha-amino-beta-hydroxy-lower alkanoic acid and N-benzoyl-L-alpha-amino-beta-hydroxy - lower alkanoic acid from the respective separated diastereomeric salt.

13. The salt of a compound of the group consisting of optically active threo-2-amino-1-(p-methylmercaptophenyl)-1,3-propanediol and optically active threo-2-amino-1-(p-methylsulfonylphenyl)-1,3-propanediol with optically active N-acyl-alpha-amino-monocarboxylic acid of the class consisting of N-acyl-alpha-amino-lower alkanoic acids, N-acylphenylalanines, and N-acyltryptophans, wherein acyl represents a radical of the class consisting of benzoyl and lower alkanoyl radicals.

14. The salt of optically active threo-2-amino-1-(p-methylmercaptophenyl)-1,3-propanediol with optically active N-lower alkanoyl-alpha-amino-lower alkanoic acid.

15. The salt of optically active threo-2-amino-1-(p-methylmercaptophenyl)-1,3-propanediol with optically active N-acetylisoleucine.

16. The salt of optically active threo-2-amino-1-(p-methylsulfonylphenyl)-1,3-propanediol with optically active N-acetylvaline.

17. The salt of optically active threo-2-amino-1-(p-methylmercaptophenyl)-1,3-propanediol with optically active N-acetyltryptophan.

18. The salt of optically active threo-2-amino-1-(p-methylmercaptophenyl)-1,3-propanediol with optically active N-benzoylserine.

19. The salt of optically active threo-2-amino-1-(p-methylsulfonylphenyl)-1,3-propanediol with optically active N-lower alkanoylmethionine.

20. The salt of optically active threo-2-amino-1-(p-methylsulfonylphenyl)-1,3-propanediol with optically active N-acetylmethionine.

21. The salt of optically active threo-2-amino-1-(p-methylmercaptophenyl)-1,3-propanediol with optically active N-acetylphenylanine.

22. The salt of optically active threo - 2 - amino - 1 - (p - methylsulfonylphenyl) - 1,3 - propanediol with optically active N - benzoyl-alpha-amino-beta-hydroxy-lower alkanoic acid.

23. In a process for resolving a racemic alpha-amino-lower aliphatic dicarboxylic acid of the class consisting of glutamic acid, aspartic acid, hydroxyglutamic acid, and alpha-methylglutamic acid, the steps which comprise: dissolving the racemic alpha-amino-lower aliphatic dicarboxylic acid with an equimolecular quantity of a compound of the group consisting of an optically active threo-2-amino-1-(p-methylmercaptophenyl)-1,3-propanediol and an optically active threo-2-amino-1-(p-methylsulfonylphenyl)-1,3-propanediol in a solvent of the class consisting of water-soluble lower alkanols, water, and mixtures thereof; and separating the diastereomeric monobasic salts thus formed by fractional crystallization.

24. The process for resolving racemic aspartic acid which comprises: dissolving racemic aspartic acid with an equimolecular quantity of an optically active threo-2-amino-1-(p-methylmercaptophenyl)-1,3-propanediol in water; separating the diastereomeric monobasic salts thus formed by fractional crystallization; and regenerating at least one of D-aspartic acid and L-aspartic acid from the respective separated diastereomeric salt.

25. The process for resolving racemic aspartic acid which comprises: dissolving racemic aspartic acid with an equimolecular quantity of an optically active threo-2-amino-1-(p-methylsulfonylphenyl)-1,3-propanediol in water; separating the diastereomeric monobasic salts thus formed by fractional crystallization; and regenerating D-aspartic acid and L-aspartic acid from the respective separated diastereomeric salts.

26. The process for resolving racemic glutamic acid which comprises: dissolving racemic glutamic acid with an equimolecular quantity of an optically active threo-2-amino-1-(p-methylmercaptophenyl)-1,3-propanediol in a mixture of water and a water-soluble lower alkanol; separating the diastereomeric monobasic salts thus formed by fractional crystallization; and regenerating at least one of D-glutamic acid and L-glutamic acid from the respective separated diastereomeric salt.

27. The process for resolving racemic glutamic acid which comprises: dissolving racemic glutamic acid with an equimolecular quantity of an optically active threo-2-amino-1-(p-methylsulfonylphenyl)-1,3-propanediol in water; separating the diastereomeric monobasic salts thus formed by fractional crystallization; and regenerating D-glutamic acid and L-glutamic acid from the respective separated diastereomeric salts.

28. The process for resolving racemic glutamic acid which comprises: dissolving racemic glutamic acid with an equimolecular quantity of an optically active threo-2-amino-1-(p-methylmercaptophenyl)-1,3-propanediol in a mixture of water and methanol; separating the diastereomeric monobasic salts thus formed by fractional crystallization; and regenerating at least one of D-glutamic acid and L-glutamic acid from the respective separated diastereomeric salt.

29. The monobasic salt of a compound of the group consisting of optically active threo-2-amino-1-(p-methylmercaptophenyl)-1,3-propanediol and optically active threo-2-amino-1-(p-methylsulfonylphenyl)-1,3-propanediol with an optically active alpha-amino-lower aliphatic dicarboxylic acid of the class consisting of glutamic acid, aspartic acid, hydroxyglutamic acid, and alpha-methylglutamic acid.

30. The monobasic salt of optically active threo-2-amino-1-(p-methylmercaptophenyl)-1,3-propanediol with optically active aspartic acid.

31. The monobasic salt of optically active threo-2-amino-1-(p-methylmercaptophenyl)-1,3-propanediol with optically active glutamic acid.

32. The monobasic salt of optically active threo-2-amino-1-(p-methylsulfonylphenyl)-1,3-propanediol with optically active aspartic acid.

33. The monobasic salt of optically active threo-2-amino-1-(p-methylsulfonylphenyl)-1,3-propanediol with optically active glutamic acid.

34. The monobasic D-threo-2-amino-1-(p-methylsulfonylphenyl)-1,3-propanediol salt of L-glutamic acid.

35. In a process for resolving racemic threo-2-amino-1-(p-methylmercaptophenyl)-1,3-propanediol, the steps which comprise: dissolving the racemic threo-2-amino-1-(p-methylmercaptophenyl)-1,3-propanediol with an equimolecular quantity of an optically active glutamic acid in a mixture of water and a water-soluble lower alkanol; and separating the diastereomeric monobasic salts thus formed by fractional crystallization.

36. The process for resolving racemic threo-2-amino-1-(p-methylmercaptophenyl)1,3-propanediol which comprises: dissolving the racemic threo-2-amino-1-(p-methylmercaptophenyl)-1,3-propanediol with an equimolecular quantity of an optically active glutamic acid in a mixture of water and methanol; separating the diastereomeric monobasic salts thus formed by fractional crystallization; and regenerating at least one of D-threo-2-amino-1-(p-methylmercaptophenyl)-1,3-propanediol and L-threo-2-amino-1-(p-methylmercaptophenyl)-1,3-propanediol from the respective separated diastereomeric salt.

References Cited in the file of this patent

UNITED STATES PATENTS

| | | |
|---|---|---|
| 2,680,135 | Gregory | June 1, 1954 |
| 2,759,972 | Suter | Aug. 21, 1956 |
| 2,766,286 | D'Amato | Oct. 9, 1956 |
| 2,797,226 | Amiard et al. | June 25, 1957 |

FOREIGN PATENTS

| | | |
|---|---|---|
| 707,903 | Great Britain | Apr. 28, 1954 |
| 1,084,218 | France | July 7, 1954 |

OTHER REFERENCES

Karrer: Organic Chemistry, pages 92–94; 260–264 (1938).

UNITED STATES PATENT OFFICE
CERTIFICATE OF CORRECTION

Patent No. 3,056,799            October 2, 1962

Benjamin F. Tullar

It is hereby certified that error appears in the above numbered patent requiring correction and that the said Letters Patent should read as corrected below.

Column 1, line 33, for "in active" read -- inactive --; column 6, line 47, for "197-99° C." read -- 197-199° C. --; column 7, line 63, for "185-187° C." read -- 184-187° C. --; column 8, line 21, for "seedew" read -- seeded --; column 13, line 15, for "D" read -- D- --; line 41, for "-2-amino-(p-" read -- -2-amino-1-(p- --; same column 13, line 58, for "omino-" read -- amino- --; column 15, line 74, for "-(p-methylcercaptophenyl)-" read -- -(p-methylmercaptophenyl)- --; column 17, line 37, for "methylmarcaptophenyl" read -- methylmercaptophenyl --; column 18, line 23, for "5-ml." read -- 5 ml. --; line 36, for "$C_{10}H_{15}NO_4 \cdot C_4H_7NO_4$" read -- $C_{10}H_{15}NO_4S \cdot C_4H_7NO_4$ --; column 19, line 67, for "phan and N-acetyl-L-tryptophan" read -- serine and N-benzoyl-L-serine --; column 20, line 7, for "-(p-methylsulfonylphenyl-1,3-" read -- -(p-methylsulfonylphenyl)-1,3- --; column 22, line 30, for "-(p-methylmercaptophenyl)1,3-" read -- -(p-methylmercaptophenyl)-1,3- --.

Signed and sealed this 29th day of October 1963.

(SEAL)
Attest:
ERNEST W. SWIDER
Attesting Officer

EDWIN L. REYNOLDS
Acting Commissioner of Patents